(12) United States Patent
Walsh et al.

(10) Patent No.: US 8,799,237 B2
(45) Date of Patent: Aug. 5, 2014

(54) IDENTIFICATION DISAMBIGUATION IN DATABASES

(75) Inventors: John P. Walsh, Atlanta, GA (US); Li Tang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 838 days.

(21) Appl. No.: 12/893,253

(22) Filed: Sep. 29, 2010

(65) Prior Publication Data

US 2011/0082862 A1  Apr. 7, 2011

Related U.S. Application Data

(60) Provisional application No. 61/247,972, filed on Oct. 2, 2009.

(51) Int. Cl.
*G06F 7/00* (2006.01)
*G06F 17/00* (2006.01)

(52) U.S. Cl.
USPC ......................................................... 707/692

(58) Field of Classification Search
USPC ......................................................... 707/692
See application file for complete search history.

(56) References Cited

U.S. PATENT DOCUMENTS

| 6,738,780 | B2 | 5/2004 | Lawrence et al. | |
|---|---|---|---|---|
| 7,444,351 | B1 | 10/2008 | Nomiyama | |
| 2006/0253418 | A1* | 11/2006 | Charnock et al. | 707/1 |
| 2007/0067285 | A1* | 3/2007 | Blume et al. | 707/5 |
| 2007/0233656 | A1 | 10/2007 | Bunescu et al. | |
| 2008/0065623 | A1 | 3/2008 | Zeng et al. | |
| 2008/0208864 | A1 | 8/2008 | Cucerzan et al. | |
| 2008/0275859 | A1 | 11/2008 | Griffith | |
| 2008/0320579 | A1 | 12/2008 | Rollins et al. | |
| 2009/0234688 | A1* | 9/2009 | Masuyama et al. | 705/7 |
| 2010/0076972 | A1* | 3/2010 | Baron et al. | 707/736 |
| 2010/0192069 | A1* | 7/2010 | Toebes et al. | 715/745 |

FOREIGN PATENT DOCUMENTS

| KR | 2008049239 A | 6/2008 |
|---|---|---|
| TW | 200832163 A | 8/2008 |

OTHER PUBLICATIONS

Abbasi et al, "Visualization authorship for identification", Proceedings of the IEEE International Conference on Intelligence and Security Informatics, 2006, pp. 60-71, S. Mehrotra et al (Eds.), Springer-Verlag, Berlin.

(Continued)

*Primary Examiner* — Fred I Ehichioya
*Assistant Examiner* — Kris Mackes
(74) *Attorney, Agent, or Firm* — Thomas | Horstemeyer, LLP

(57) ABSTRACT

Various examples are provided for identification disambiguation in databases. In one example, among others, a system includes an approximate structural equivalence (ASE) analyzer. The ASE analyzer can obtain a set of records from a database; determine a knowledge homogeneity score (KHS) for a pair of records in the set of records; and determine a condition of ASE for the pair of records based upon the KHS and a predefined KHS threshold. In another example, a method can determine a plurality of references shared by at least two records in a set of records; and a weighting value for each shared reference. A KHS may then be determined for each pair of records in the set of records based upon a reference shared by the pair of records and the weighting value corresponding to the shared reference.

31 Claims, 7 Drawing Sheets

(56) References Cited

OTHER PUBLICATIONS

C.L. Borgman et al, "Getty's SyndromeTM and its cousins: A survey of applications of personal name-matching algorithms", Journal of the American Society for Information Science, 1992, 43(7), pp. 459-476, John Wiley & Sons, Inc.

H. Han et al, "Two Supervised Learning Approaches for Name Disambiguation in Author Citations", Proceedings of the ACM/IEEE Joint Conference on Digital Libraries, Jun. 7-11, 2004, pp. 296-305, Tucson, Arizona.

H. Han et al, "A Hierarchical Naive Bayes Mixture Model for Name Disambiguation in Author Citations", Proceedings of the 2005 ACM Symposium on Applied Computing, Mar. 13-17, 2005, pp. 1065-1069, Santa Fe, New MexicH.

H. Han et al, "Name Disambiguation in Author Citations using a K-way Spectral Clustering Method", Proceedings of the 5th Annual ACM/IEEE Joint Conference on Digital Libraries, Jun. 7-11, 2005, pp. 334-343, ACM Press, Denver, Colorado.

J. Houvardas et al, "N-gram Feature Selection for Authorship Identification", AIMSA '06, LNCS 4183, 2006, pp. 77-86, Springer-Verlag, Berlin.

J. Huang et al, "Fast Author Name Disambiguation in CiteSeer", Working paper, www.cse.psu.edu/~sertekin/Papers/IST-TR_DisambiguationCiteseer.pdf, 2006.

I.S. Kang et al, "On Co-authorship for Author Disambiguation", Information Processing and Management 45, 2009, pp. 84-97, Elsevier Ltd.

R. Lai et al, "The Careers and Co-authorship Networks of U.S. Patent Holders Since 1975", Working Paper, 2009.

H. Pasula et al, "Identity Uncertainty and Citation Matching", paper presented at the Advances in Neural Information Processing (NIPS), 2004.

J. Raffo et al, "How to Play the 'Names Game': Patent Retrieval Comparing Different Heuristics", Research Policy, 38(10), 1617-1627, 2009.

N.R. Smalheiser et al, "Author Name Disambiguation", Annual Review of Information Science and Technology, 2009, vol. 43, American Society for Information Science and Technology (ASIST), Information Today, Inc., Maryland.

Jose M. Soler, "Separating the Articles of Authors with the Same Name", Scientometrics, 2007, pp. 281-290, vol. 72, No. 2, Akademiai Kiado, Budapest and Springer, Dordrecht.

A. Strotmann et al, Author Name Disambiguation for Collaboration Network Analysis. Working Paper, 2008.

V.I. Torvik et al, "Author Name Disambiguation in Medline," ACM Transactions on Knowledge Discovery From Data, Jul. 2009, pp. 11:1-11:29, vol. 3, No. 3, Article 11.

M. Trajtenberg et al, "The 'Names Game': Harnessing Inventors Patent Data for Economic Research", National Bureau of Economic Research, Working Paper No. 12479, 2006.

P. Treeratpituk et al, "Disambiguating Authors in Academic Publications Using Random Forests", Paper presented at JCDL, 2009, Austin, Texas.

S. Wooding et al, "Co-author Inclusion: A Novel Recursive Algorithmic Method for Dealing with Homonyms in Bibliometric Analysis", Scientometrics, 2006, vol. 66, No. 1, pp. 11-21, Akademiai Kiado, Budapest and Springer, Dordrect.

Li Tang et al, "Bibliometric Fingerprints; Name Disambiguation Based on Approximate Structure Equivalence of Cognitive Maps", Scientometrics, Published on-line Apr. 8, 2010, DOI 10.1007/s11192-010-0196-6, Akademiai Kiado, Budapest and Springer, Dordrect.

\* cited by examiner

IDENTIFICATION DISAMBIGUATION IN DATABASES

CROSS REFERENCE TO RELATED APPLICATIONS

This application claims priority to U.S. provisional application entitled "Method for Name Disambiguation in Authorship/Inventor Databases" having Ser. No. 61/247,972, filed Oct. 2, 2009, the entirety of which is hereby incorporated by reference.

BACKGROUND

Identification uncertainty is a ubiquitous challenge for many fields ranging from art museums to credit bureaus to crime investigation to analysis of researcher publications and patents. The expansion of the number of researchers, the increasing internationalization of publications, and the rise of large-scale digital libraries are making disambiguation more difficult. Additionally, the growing numbers of scholars, researchers, and inventors who share the same family name further complicate disambiguation.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
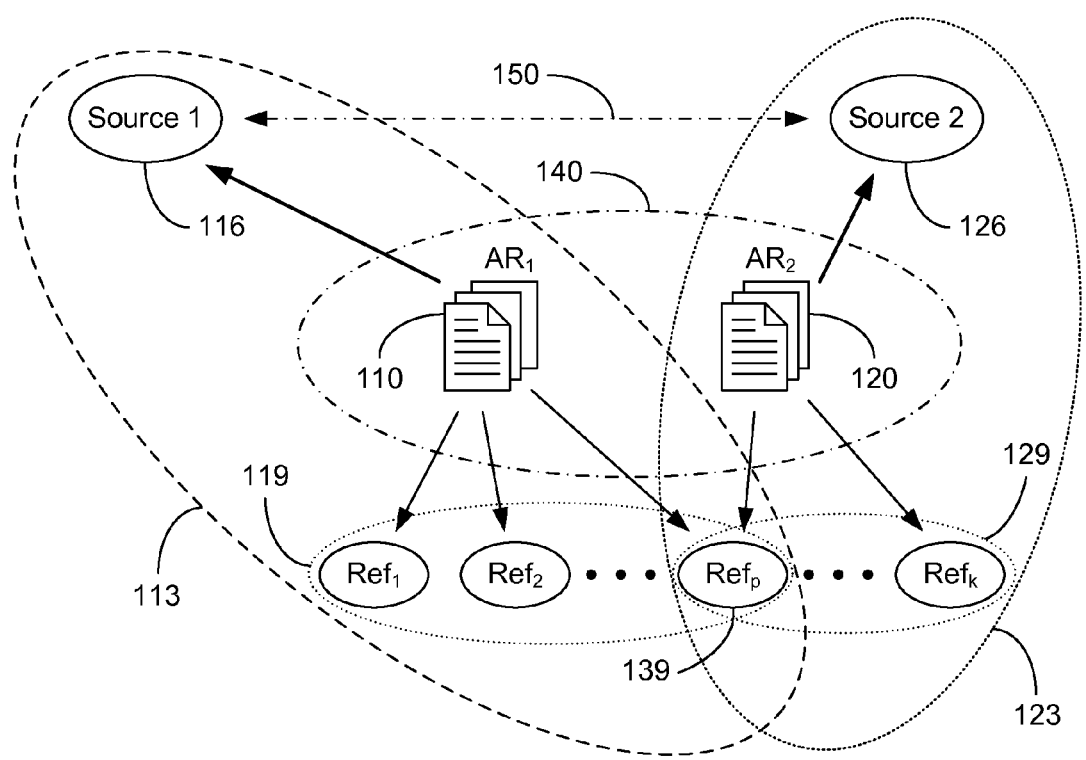
FIG. 1 illustrates an example of identification disambiguation of two database records in accordance with various embodiments of the present disclosure.

Disclosed herein are various embodiments of methods and systems related to identification disambiguation. Reference will now be made in detail to the description of the embodiments as illustrated in the drawings, wherein like reference numbers indicate like parts throughout the several views.

Ambiguity exists when records in a database or a set of records are referenced by the same or similar identifier of a source (e.g., names of authors, researchers, inventors, etc.). This problem can appear in studies such as, but not limited to, scientists' productivity, inventor mobility, and scientific collaboration. Disambiguation provides a way to identify whether two records with the same or similar source identification refer to the same individual. For example, the common name problem remains a difficult challenge in name disambiguation in databases, e.g., academic and scientific publication databases, trade and industrial publication databases, and patent publication databases including published patents and/or patent applications, as well as others. A single source may be associated with different names or identifiers due to: (a) variations of personal spellings, (b) typographical and phonetic errors, (c) translation and transliteration, and (d) name changes over time associated with marriage and other reasons. In addition, different sources with the same names have caused disambiguation to be increasingly problematic. For example, the growth in scientific publications and patents from China has made disambiguation even more difficult because of the large number of Chinese scholars and engineers sharing a few family names such as Zhang, Wang, Li and Chen. Further, the emergence of interdisciplinary research and research collaboration make the subject of the document and the author affiliation (or lack thereof) rather weak aids in source differentiation. Limitations within the database or set of records such as abbreviated names and lack of affiliation of authors may also limit the efficacy of traditional methods of disambiguation. Table 1 provides some examples of name ambiguity factors and their potential consequences.

Disambiguation may utilize the bibliometric fingerprints of the records to determine whether the same individual is associated two or more of the records. The disambiguation of the source can be based upon an approximate structural equivalence (ASE) analysis. The ASE analysis is based upon the assumption that database records such as, but not limited to, research papers, articles, and/or patent applications are a reflection of the knowledge base of the source(s) of the record(s), with each source drawing from his or her own knowledge base that is generated through his or her particular training and experience. In particular, a source's experience within different fields, subfields, and institutions is likely to expose the source to a different set of published and

TABLE 1

| Factors | Examples | Consequences |
| --- | --- | --- |
| Variations of personal spellings | Walsh, J<br>Walsh, J P<br>John P. Walsh<br>J P Walsh | Potential under-matching error |
| Typographical and phonetic errors | Wlash, P<br>Walhs, P | Potential under-matching error |
| Translation and transliteration | Li Yue is the translation of different Chinese names such as 李玥, 李月, 李悦, 李跃, 李乐, to name just a few, as well as any combination of these first and second Chinese characters. Li Yan could be 李妍, 李燕, 李彦, 李艳, 李岩, 李雁 etc. | Potential over-matching error |
| Name changes over time | Anne Walsh changed her name after marriage. | Potential under-matching error |
| Common names | Smith, Walsh, Li, Kim, etc. | Potential over-matching error | unpublished literature than that encountered by another source. Similarly, attending particular conferences and workshops is likely to give one access to a specific set of unpublished or recently published papers. In the production of their own publications, which may be subsequently stored as records in one or more databases, source(s) draw on this unique collection of acquired research results. That is to say, within a certain time period, the same source is drawing from the same knowledge set, while different source(s) (e.g., those with the same name) draw on different knowledge sets. This process of acquiring, storing, and recalling knowledge and experience is similar to mental representation of allocentric space in an individual's cognitive map.

The linkage of different records associated with the same source may be visualized using the concept of structural equivalence (SE) in social network analysis. In a single-relation network, two actors are structurally equivalent if they have identical ties to and from all other actors within a group. In reality, however, true structural equivalence is rare. Therefore, the definition of equivalence is relaxed to approximate structural equivalence (ASE), such that actors within a structurally equivalent cluster are more similar to each other than to those outside the cluster. Applying this notion to the name ambiguity issue, two records may be considered to have ASE if they are similar in position with respect to referencing article(s), paper(s), and/or other publication(s) in an article-reference (or record-reference) bipartite network. If these structurally equivalent records contain source names (e.g., author names) with the same (or similar) family name and first initial, these similar sources may be considered to be the same individual. Accordingly, disambiguation of the sources can be accomplished utilizing the ASE analysis.

Referring to FIG. 1, an example of name disambiguation of two records is illustrated in accordance with various embodiments of the present disclosure. A record includes one or more sources (e.g., author, researcher, inventor, etc.) and one or more cited references. References may be cited within the text of the published record and/or as a separate listing that are referred to by a designated marker (e.g., number, letter, or symbol). In the exemplary embodiment of FIG. 1, two records 110 and 120 (e.g., research papers $AR_1$ and $AR_2$), including their associated source(s) and reference(s) are indicated by 113 and 123. While the embodiment of FIG. 1 illustrates a single source 116 and 126 for each record 110 and 120 respectively, each record 110 and 120 may be associated with one or more additional sources that are not depicted.

Each record 110 and 120 is also associated with their own set of references 119 and 129, respectively. A one or more of these references 119 and 129 may be common to both (e.g., $Ref_p$ 139). If the shared reference(s) are important enough to suggest a high degree of knowledge similarity between the records 110 and 120 (e.g., the records share a certain number of common references or a rare reference, as will be described in more detail below), then the two records 110 and 120 may be considered to be approximately structurally equivalent 140. If the sources 116 and 126 have the same (or similar) family name and first initial, these sources 116 and 126 may be determined to be the same individual 150. Disambiguation can provide identification of the source of a record in the database or a set of records from one or more databases, as well as determining which papers within the database or set of records are associated with the same source.

The ASE evaluation of a set of records is based upon the similarity of each pair of records, which is measured by a knowledge homogeneity score (KHS). The value of the KHS is based upon three factors: the summation of shared references, the forward citations of each reported reference, and the minimum number of references reported by the pair of records. It is assumed that a source's knowledge stock on a specific research problem is reflected by the reference coverage of that record at a given time. The more references a pair of records share, the more likely they are associated with the same source. Given the heterogeneity of cited references, weights are used to moderate the predictability of shared references on record clustering. For example, the more famous a cited reference is, the more likely that it is cited within records by different sources. In contrast, the chance that two different researchers cite a newly presented conference paper would be very low. Thus, if two records are associated with an author of the same family name and first initial, and both of the records reference a rarely cited reference, the likelihood that these two records are produced by the same author will be extremely high. This bibliometric fingerprint of a record is analogous to the fingerprint biometric system where the fingerprint tail differentiates people. In terms of number of references cited, the more references that a record cites, the higher probability it shares references with the others. Thus, if a pair of records cite a small number of references, but still share a certain number of references, the chance that they are associated with the same source will be much higher than the case where the records cite many references.

Mathematically, the KHS matrix can be denoted as:

$$KHS=[A*R]_{n\times m}*W_{1m\times m}*W'_{1m\times m}*[A*R]'_{m\times n}\bullet Q_{n\times n}$$

where $A=\{AR_1, AR_2, \ldots, AR_n\}$ is a set of records (e.g., a set of n targeted publications) and $R=\{Ref_1, Ref_2, \ldots, Ref_m\}$ is the set of shared references cited by A. A cited reference is considered a shared reference if the reference is cited by more than one record in A. The record-reference matrix $[A*R]_{n\times m}$ denotes a two-mode, unidirectional co-occurrence matrix, in which the value of each cell is either 1 or 0 based upon whether a record of A cites a reference of R or not.

Weighting of the references is provided by the ordered weighting matrix $W_{1m\times m}=diag(W_1)$, where $W_1=\{w_{11}, w_{12}, \ldots, w_{1m}\}$ is an ordered weighting vector with a dimension of 1×m, and the off-diagonal elements of $W_{1m\times m}$ are all set to 0. The value of each weight is based on the number of forward citations of each reference, and $w_{1j}$ is the weight of the $j^{th}$ reference, $1\leq j\leq m$. In addition, matrix $Q_{n\times n}$ weights KHS based upon the number of references. $Q_{n\times n}$ is a weighting matrix transformed from an ordered weighing vector $W_2$ with $q_{ij}=q_{ji}=max(w_{2i}, w_{2j})$, where $W_2=\{w_{21}, w_{22}, \ldots, w_{2n}\}$ is based upon the number of references cited by the records, and $w_{2j}$ is the weight of the $j^{th}$ record, $1\leq j\leq n$. The symbol "$\bullet$" denotes the entrywise product.

The weighting values of ordered weighting vectors $W_1$ and $W_2$ may be determined based upon quartile weightings. For example, the records may be separated into quartiles based upon the number of shared references cited by the record. The weighting value for $W_1$ and/or $W_2$ may then be assigned based upon which quartile is associated with the record. In other embodiments, the weighting values may be determined based upon separation into quintiles, deciles, or other groupings. In alternative embodiments, the weighting values may be based upon the inverse of individual values (e.g., $w_{1m}=1/$ the number of cited references) or predefined thresholds based upon historical data (e.g., separation levels that are based upon general distributions of cited references in the whole database of publications or patents).

The KHS may then be utilized to determine links between records in the set. Once the KHS matrix is determined, hierarchical clustering with a single linkage can be adopted to differentiate groupings of the records. If the knowledge homogeneity score between record i and record j (i.e., KHS [i,j]) is above a KHS threshold value, and KHS[i,k] is also above the KHS threshold value, then records i, j, and k can be grouped together as associated with the same source (e.g., the same author of publications i, j, and k).

Disambiguation of sources may experience mismatching of two types (i.e., under-matching and over-matching may occur). An error of under-matching can occur if a source (e.g., a researcher) has such broad research interests that a corresponding record (e.g., one of his publications) does not have any overlapping reference citations with other records associated with the source. On the other hand, an over-matching error can happen if two researchers focus on the same topic and thus read and cite the same literature. The weighting vectors $W_1$ and $W_2$ are utilized to reduce both error types by weighting rare references more heavily than common references and compensating for the number of cited references. In addition, over-matching errors may be reduced by setting up a sufficiently high KHS threshold value.

The ASE analysis may also account for within-author shifts in subject area across papers by using a hierarchical agglomeration with a nearest neighbor criterion. This can provide transitivity, allowing for the fact that a source may not focus on a single research topic within a given period but may be involved in multiple areas at once. According to the principle of "friends of friends", if the KHS indicates that a pair of records (e.g., $AR_1$ 110 and $AR_2$ 120 of FIG. 1) are associated with the same source and that one of the pair of records is ASE with a third record (e.g., $AR_2$ 120 and $AR_3$, which is not shown in FIG. 1) indicating that the third record associated with the same source, then the other record of the pair of records ($AR_1$ 110) may also be considered to share the same source with the third record ($AR_3$) even if these two records include no shared citations. In other words, any source (e.g., author, researcher, inventor, etc.) will be placed in only a single cluster.

Figure 2:
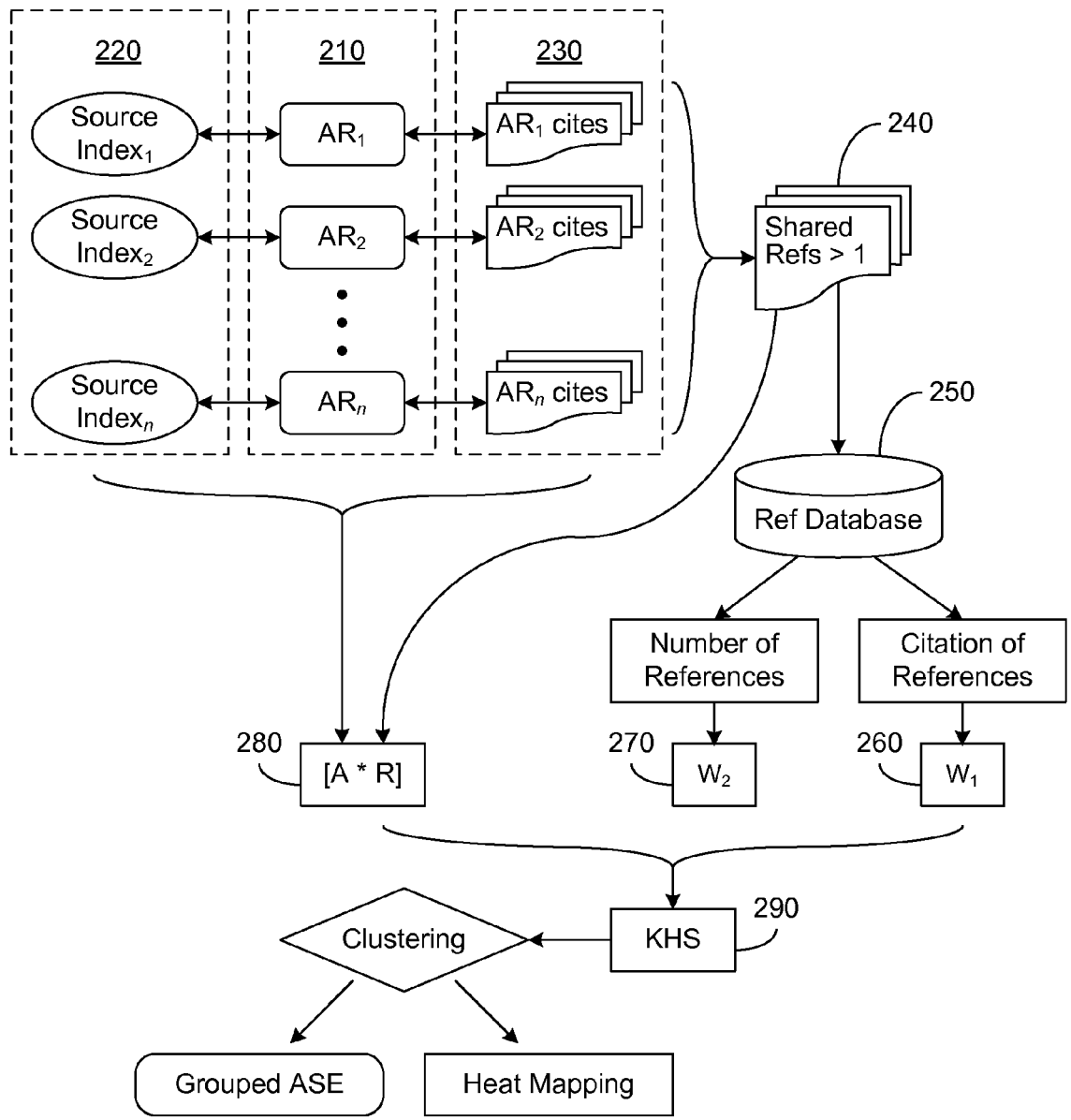
FIG. 2 is a graphical illustration of an approximate structural equivalence (ASE) analysis that can be utilized during the identification disambiguation of FIG. 1 according to various embodiments of the present disclosure.

Referring now to FIG. 2, the ASE analysis is further illustrated for source identification. Initially, a set of records 210 (e.g., a set of publications $AR_1, AR_2, \ldots, AR_n$) are obtained. The records in the set 210 may be associated with the same or different databases. The sources 220 and cited references 230 associated with the records in the set 210 may then be determined. In one embodiment, bibliographic information such as the source and cited reference(s) is extracted from the records. In alternative embodiments, some or all of the bibliographic information may be obtained from a table or database associated with one or more record. Shared reference 240 may then be determined from the cited references 230. A reference is considered shared if more than one record in the set 210 cites the reference.

A reference database 250 such as, but not limited to, the Web of Science, Google Scholar, Scopus, or CiteSeer may then be used to determine the weighting of the shared references 240. The forward citations of each shared reference 240 can be collected from, e.g., the Cited Reference Search in Web of Science (or from searches of other citation databases, such as Google Scholar, Scopus, and/or CiteSeer). The weighting value for each shared reference 240 may then be determined based upon the volume of forward citations for that reference 240. For example, if a shared reference has been cited by a large number of records, then the shared reference may be considered common and a lower weighting value may be associated with that shared reference. In contrast, if a shared reference is cited by only a few records, then this shared reference may be considered rare and assigned a higher weighting value. In some embodiments, the weighting value of a shared reference is based upon a predefined scale where a predefined value is assigned for a fixed range of citations (e.g., if the number of citations is in the range of 20-30, then a weight of two is applied, while those above 30 have a weight of one and those below 20 have weights greater than two or, alternatively, related to the inverse of cited references). An ordered weighting vector $W_1$ 260 (and/or an ordered weighting matrix) may then be established from the weighting values.

Self-citation may also be used for disambiguation of a source. Such self-citation is common, but of course depends on disambiguation to figure out if "Smith" citing "Smith" is a self-citation. Instead, ASE analysis uses the fact that self-citation is likely to be more common for the same source than citation by another source. Hence, a self-citation will get a higher weighting and increase the KHS of records associated with self-citations.

The number of references (e.g., shared, unshared, and/or total) cited by each record in the set 210 may also be determined from the bibliographic information. This information may be used to determine weighing vector $W_2$ 270. The shared references 240 associated with each of the set of records 210, [A*R] 280, may also be determined from the bibliographic information. Other relationships may also be established from the bibliographic information of the set of records 210 such as, but not limited to, the relationship between sources 220 and cited references 230.

The KHS 290 providing an indication of the ASE between records of the set 210 may then be determined based upon the cited references 230 associated with the records in the set 210. One or more thresholds may be used to determine the ASE of the records in the set 210. As discussed previously, weighting values based upon the forward citations of the references and the number of references may be utilized in the determination of the KHS 290 to reduce mismatching of the records. The KHS 290 may be used to group or cluster the records, thereby indicating equivalence of the associated sources. In this way, the ASE analysis partitions sources into groups or blocks based upon the cited reference networks. The results may be provided for display as groups of ASE records or visually clustered as heat maps. Such a grouping can be used as the input to an analysis of productivity of scientific authors such as, but not limited to, for an evaluation; for mapping technology trajectories of inventors; for generating mailing lists for surveys of inventors, authors or other sources; and to refine the display of bibliometric data (publications, patents, etc.) in answers to search queries on the database (e.g., showing all the papers by John P. Walsh in Web of Science). In some embodiments, additional information, such as common affiliations (organization, assignee, etc.), shared co-authors/co-inventors, common keywords, field codes or patent classes, may be added to the matrix to produce an N-dimensional clustering.

While the ASE analysis has been described in terms of authorship of publications, it may also be utilized in other situations. For example, disambiguation of inventors in patent databases may be accomplished based upon cited prior art. In addition, ASE analysis may be used to disambiguate the identity of shoppers (i.e., source) based on the particular mix of items in the shopping basket (i.e., records) selected by a shopper, which can be weighted by how unlikely the items are. In this case, the shopper's fingerprint is based on which items are in the basket and how rare those items are. The weighting values may be based upon, e.g., the sales of an item ($W_1$) and the number of items in a basket ($W_2$). Data for this evaluation may be available through companies that track scanner data (e.g., SymphonyIRI). The ASE analysis may also be extended to viewership or listenership data from ratings services such as, but not limited to, Nielsen to disambiguate the identity of the individual (e.g., user, viewer, or listener) based upon accessing history such as, but not limited to, the shows watched or the songs listened to during a given period of time. The analysis may be based upon information such as viewer tracking data obtained from the service or technology for tracking the channel that a tv, radio or computer is tuned to. In some embodiments, the rating (e.g., the number of viewers/listeners of that program) and the number of programs, shows, songs, etc. accessed by a viewer/listener may be used to determine the weighting values $W_1$ and $W_2$, respectively. The identity of users (or viewers) of shared or publicly available computers may also be determined based upon accessing history such as, but not limited to, web page tracking, by noticing which bundle of web pages are searched in a given session and weighting the web pages by the inverse of their rarity. For example, in web page tracking, the weighting values may be based upon the number of hits to that web page ($W_1$) and the number of web pages visited ($W_2$).

Figure 3:
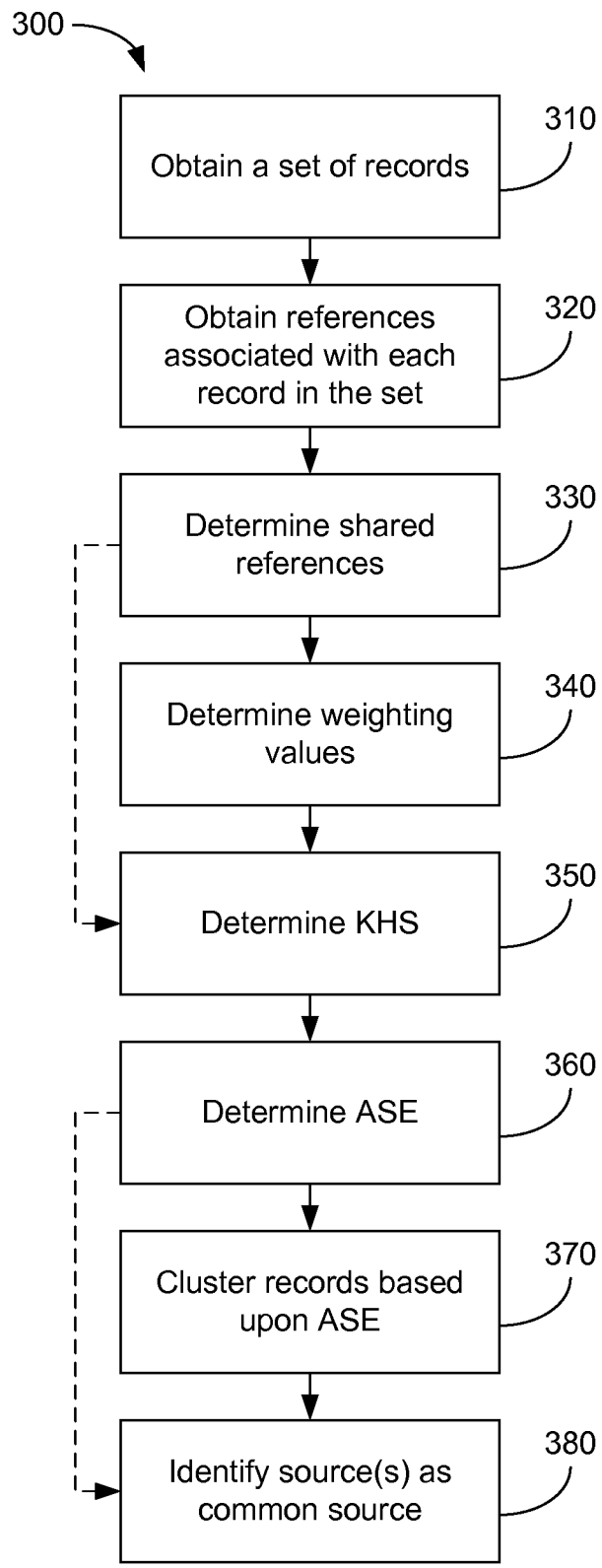
FIG. 3 is a flowchart illustrating functionality implemented as portions of the ASE analysis of FIG. 2 according to various embodiments of the present disclosure.

With reference to FIG. 3, shown is a flow chart 300 illustrating functionality implemented as portions of the ASE analysis. The ASE analysis may be performed by an ASE analyzer implemented on a computing device. Beginning with block 310, a set of records such as, but not limited to, publications and/or patents is obtained. The set of records may be obtained from a single database or a combination of databases. References for each record in the set of records are obtained in block 320. For example, references cited by a publication or a patent may be extracted from the record or obtained from a listing associated with the record. In block 330, references shared by two or more records in the set of records are determined. For example, a reference cited by two or more publications is considered a shared reference.

In some embodiments, weighting values corresponding to each shared reference is determined in block 340. The forward citations associated with each reference may be used to determine a weighing value corresponding to one of the shared references. Additionally, the number of references cited by the records may also be used to determine a weighted value for each record. A knowledge homogeneity score (KHS) may then be determined for each pair of references in the set in block 350 using the weighted values from block 340. In alternative embodiments, the KHS may be determined in block 350 without weighting values (e.g., by setting all weights to one).

The KHS may be used to determine the approximate structural equivalence (ASE) for each pair of records in the set of records in block 360. If the determined KHS meets a KHS threshold requirement, then the pair of records are considered or designated to have ASE. In some embodiments the threshold is a predetermined value, while in other embodiments, the threshold may be adjusted to improve the results. The records may then be clustered based upon the determined ASE condition of the pair of records in block 370. The clustered records may be provided for rendering as a dendrogram, a heat map, a listing of shared records by source, or other appropriate visualization. Sources of the reports may be identified as different or the same (e.g., common to a plurality of records) in block 380. In some cases, the clustering of block 370 may be bypassed during identification disambiguation.

Figure 4:
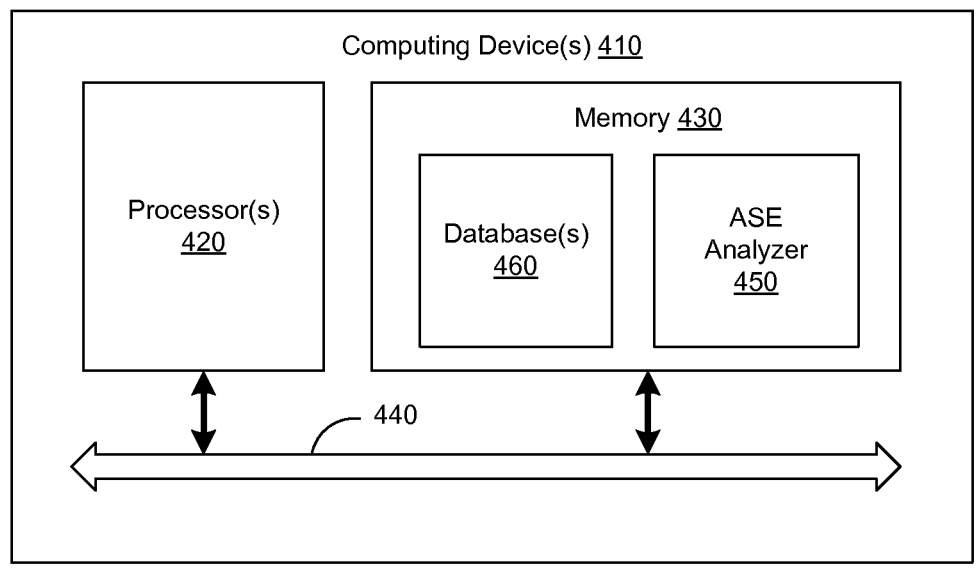
FIG. 4 is a schematic block diagram that provides one example illustration of a computing device that implements portions of the ASE analysis of FIGS. 2 and 3 according to various embodiments of the present disclosure.

Referring next to FIG. 4, shown is a schematic block diagram of the computing device 410 according to various embodiments of the present disclosure. The computing device 410 includes at least one processor circuit, for example, having a processor 420 and a memory 430, both of which are coupled to a local interface 440. To this end, the computing device 410 may comprise, for example, at least one server computer or like device. The local interface 440 may comprise, for example, a data bus with an accompanying address/control bus or other bus structure as can be appreciated.

Stored in the memory 430 are both data and several components that are executable by the processor 420. In particular, stored in the memory 430 and executable by the processor 420 are an approximate structural equivalence (ASE) analyzer 450, and potentially other applications. Also stored in the memory 430 may be a database 460 and other data. In addition, an operating system may be stored in the memory 430 and executable by the processor 420. While not illustrated, it is understood that there may be remote databases that are accessible to the computing device 410 through the local interface 440.

It is understood that there may be other applications that are stored in the memory 430 and are executable by the processors 420 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, R, or other programming languages.

A number of software components are stored in the memory 430 and are executable by the processor 420. In this respect, the term "executable" means a program file that is in a form that can ultimately be run by the processor 420. Examples of executable programs may be, for example, a compiled program that can be translated into machine code in a format that can be loaded into a random access portion of the memory 430 and run by the processor 420, source code that may be expressed in proper format such as object code that is capable of being loaded into a random access portion of the memory 430 and executed by the processor 420, or source code that may be interpreted by another executable program to generate instructions in a random access portion of the memory 430 to be executed by the processor 420, etc. An executable program may be stored in any portion or component of the memory 430 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 430 is defined herein as including both volatile and nonvolatile memory and data storage components. Volatile components are those that do not retain data values upon loss of power. Nonvolatile components are those that retain data upon a loss of power. Thus, the memory 430 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 420 may represent multiple processors and the memory 430 may represent multiple memories that operate in parallel processing circuits, respectively. In such a case, the local interface 440 may be an appropriate network that facilitates communication between any two of the multiple processors 420, between any processor 420 and any of the memories 430, or between any two of the memories 430, etc. The local interface 440 may comprise additional systems designed to coordinate this communication, including, for example, performing load balancing. The processor 420 may be of electrical or of some other available construction.

Although the ASE analyzer 450 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The graphical representation of FIG. 2 and flow chart of FIG. 3 illustrate the functionality and operation of an implementation of portions of the ASE analyzer 450. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 420 in a computer system or other system. The machine code may be converted from the source code, etc. If embodied in hardware, each block may represent a circuit or a number of interconnected circuits to implement the specified logical function(s).

Although the graphical representation of FIG. 2 and flow chart of FIG. 3 show a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the ASE analyzer 450, that comprises software or code can be embodied in any non-transitory computer-readable medium for use by or in connection with an instruction execution system such as, for example, a processor 420 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

EXAMPLES

The ASE analysis will be further illustrated by two cases: (1) an American social scientist case with a relatively common name, and (2) a Chinese origin scientist in the nanotechnology domain.

Case 1: Walsh, J P

The first case addresses the relatively common name of "John P. Walsh", which is rendered as "Walsh, J" or "Walsh, J P" in the Web of Science (WoS) databases, based on the following three considerations. First, "Walsh, J*" is a relatively popular name. According to the 2000 census, "Walsh" was ranked as the 265th most common surname in the United States. Second, several authors under the search designation "Walsh, J*" have publications indexed in Web of Science with some "Walsh, J" work in a similar or even the same research field. Third, within the examined period of 2004-2008, at least one "Walsh, J" moved and thus reported different affiliations in his publications. A cross-checking can be made by verifying that classification was correctly derived from reading each publication.

An initial group of 125 records was provided by searching for publications written by "Walsh J" during the period of 2004-2008 in the Social Sciences Citation Index dataset. Use of the wild-card character "*" instead of a middle initial relaxed the formats of reported author names and provided a larger set of publications. The full records were exported to VantagePoint data mining software developed by Search Technology, Inc. The 125 records were first clustered into three groups: group one including publications written by "Walsh, J"; group two including publications written by "Walsh, J P"; and Group three including those publications written by "Walsh, J?" with "?" not "P". Group 1 and group 2 were combined to provide a set of 69 publications. Among these publications, 72% report cited references, in which 24 shared common references and 26 do not. The publications without references include letters, book reviews, etc. The 26 cases without shared references are treated as singletons (i.e., having unique sources or authors) on the assumption that if the record shares no references with another record in the set, they are unlikely to be any of those sources.

The set of 24 records associated with "Walsh, J" are published in 17 journals and involved at least 55 authors from 32 research institutions. About 50% of the records provided full names of the author. For verification of the ASE analysis, the missing full names were obtained from the original full text of publications. The number of references cited by the records range from 6 to 162, with a total of 114 unique references appearing at least twice (i.e., 114 shared references cited by at least two records). The number of forward citations for each of these 114 references was collected from the Cited References database in WoS. $W_1$ and $W_2$ were then constructed from the acquired bibliographic information.

The weighting values of $W_1$ and $W_2$ were determined based on the quartile distributions of visibility of references and the minimum number of reported references between each pair of targeted papers respectively. For $W_1$, if a shared reference was in the first quartile of the number of forward citations, the shared reference was given a weight of 8, if in the second quartile, the weight was 3, if in the third quartile, the weight was 2, and if in the fourth quartile, the weight was one. The numbers of forward citations associated with the 114 shared references range from 2 to 40819. Three cutoff points are set at the first quartile (26.5), the third quartile (287), and the median (91), which split the ordered forward citations into four segments. Thus, the weighting value was set at eight for a reference receiving citations less than 26.5; three for a reference receiving citations between 26.5 and 91; two for a reference receiving citations between 91 and 287; and one for a reference receiving citations above 287.

For $W_2$, if the number of cited shared references was in the first quartile of the cited shared reference counts, the weight was set at 4, if in the second quartile, the weight was 3, if in the third quartile, the weight was 2 and if in the fourth quartile, the weight was one. The numbers of references of those 24 sources range from 6 to 162. Three cutoff points are established at first quartile (29.8), third quartile (58.8), and median (42), which split the ordered number of references into four segments. The weighting value was set at four for the record reporting the number of references less than 29.8; three for the record reporting the number of references between 29.8 and 42; two for the record reporting the number of references between 42 and 58.8; and one for the record reporting the number of references above 58.8.

Figure 5:
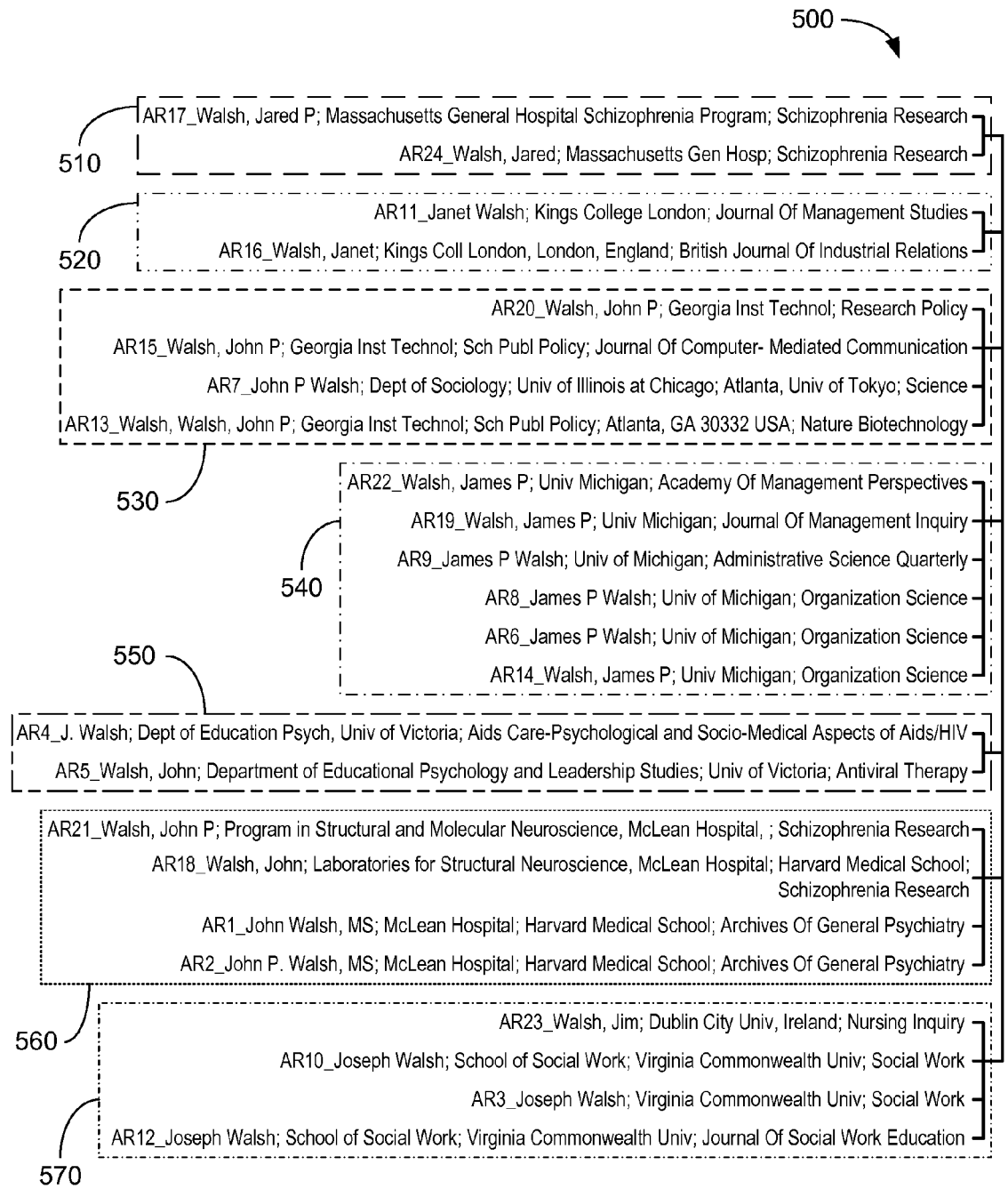
FIGS. 5 and 6 are graphical illustrations of an exemplary dendrogram and heat map of ASE clusters, respectively, which are identified using the ASE analysis of FIGS. 2 and 3 according to various embodiments of the present disclosure.

The weighting of $W_1$ and $W_2$, combined with relationship between the set of records and cited shared references [A*R], were used to determine the knowledge homogeneity score (KHS) between the records. A KHS threshold was then utilized to perform hierarchical clustering with single linkage of the records. Seven ASE clusters emerged from the set of "Walsh, J*" records. FIG. 5 illustrates a dendrogram 500 of the seven ASE clusters 510 through 570. In the dendrogram 500, publications by the same source are clustered within the same frame. While the affiliations of the authors are indicated in the dendrogram for the reader's convenience, it should be noted that the ASE analysis does not utilize the affiliations for disambiguation, in part because such information is often not readily available in publication databases.

The clusters 510 through 570 are all crisp clusters in which each element has a clear membership. It should be noted that in case 1, the ASE analysis produced an over-matching error by misassigning AR23 by Jim Walsh in cluster 570 with three publications (AR10, AR3, and AR12) by Joseph Walsh. Examination indicated that the misassignment occurred because publication AR10, an article reporting few references, shares with publication AR23 a rarely cited reference. In the ASE analysis, the KHS between AR10 and AR23 was high enough to meet the KHS threshold, indicating that the two publications are ASE, and thus causing AR23 to be included in cluster 570. The verification results indicated an accuracy rate of approximately 95% (for those cases with at least one shared reference).

Figure 6:
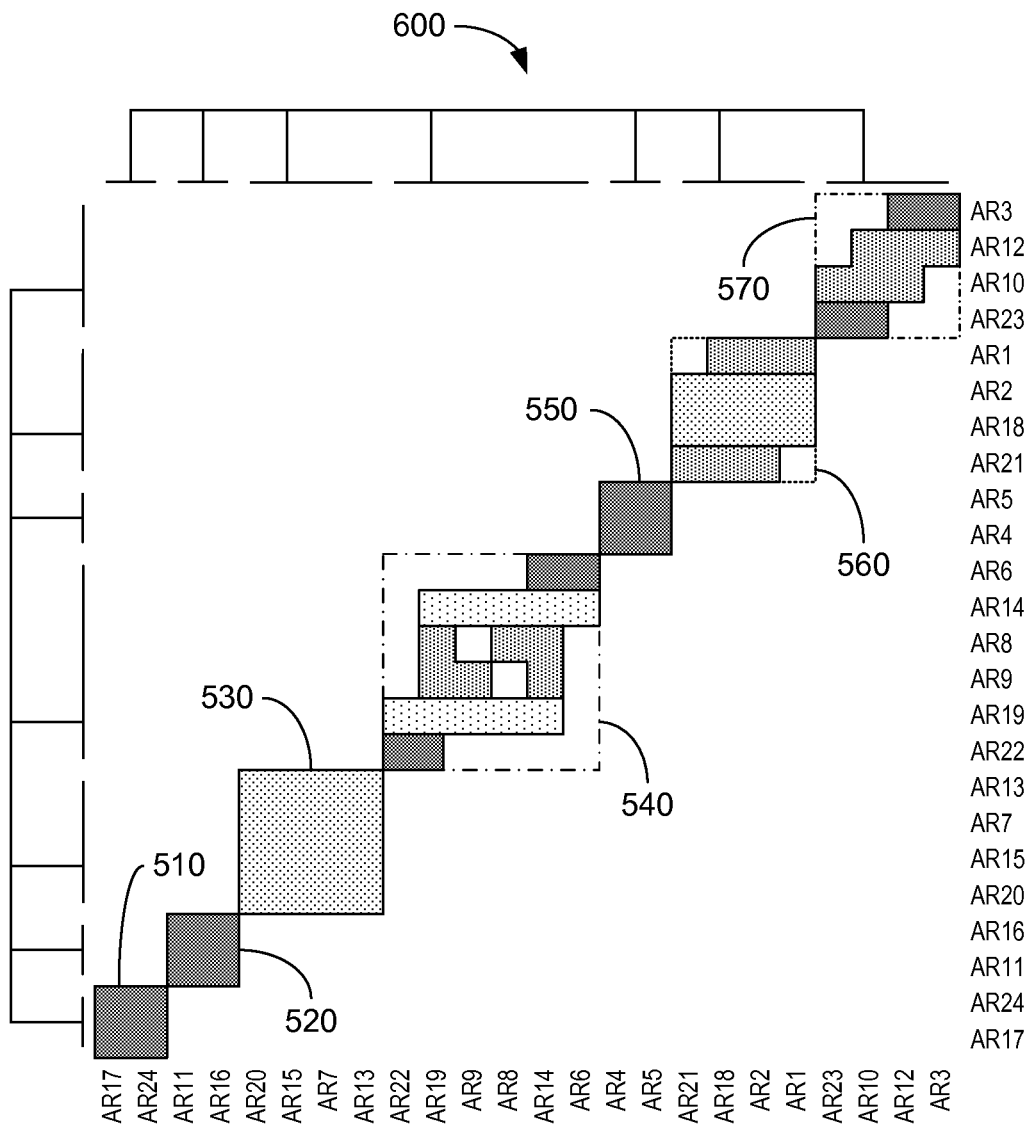

The clusters 510 through 570 may also be displayed as a heat map 600 as depicted in FIG. 6. In the heat map 600, publications that possess the same pattern (or color) are grouped together illustrating the single linkage within each cluster.

Case 2: Li, Y

The second case addresses the Chinese name of "Y. Li", a Chinese origin nanoscientist. Asian names, particularly Chinese names, are notoriously challenging for disambiguation because of the commonality of a few family names and the English translation and transliteration variations. The name selection was based on the following considerations. To begin with, China has recently become one of the top producers of research papers. China's rapidly expanding researcher base, translation & transliteration issues, as well as the number of Chinese scholars residing overseas and in China make it a daunting challenge to distinguish Chinese researchers with the same family name and first initial. Second, nanotechnology was chosen in part because many research evaluations have been conducted in this field. Furthermore, limiting the evaluation to one field (although a very broad one) increases the difficulty of the problem, since key words, subject categories or other commonly used means of disambiguation may be less effective. Finally, the name "Li, Y" was targeted because it is one of the most frequent author names appearing in the nano publication database, as well as being identified as the most prolific Chinese nanoscientist in a prior publication study. Even in the United States, Li has become a fairly common name, currently ranked as 519th on the list of common names, up from 2084th in the 1990 census.

Initially, a search of the Georgia Institute of Technology nano publication database for all "Li, Y" nano papers published in 2007 returned 221 matches. The year 2007 was used because full author names are viewable on the full record of some journals indexed in WoS beginning in September 2006, making verification of the results easier. A one-year span of publications also reduces the possibility of researcher mobility, which theoretically reduces the error of a "name+affiliation" method of disambiguation. This provides a conservative test of the benefits of the ASE analysis. Moreover, the large number of common-named authors in a single year in one field suggests the magnitude of the identification disambiguation problem.

Excluding publications that do not share references with the other "Li, Y" publications by treating them as singletons, a set of 145 records associated with 376 shared references was obtained. These records are published in 82 journals spanning across 33 subject categories as defined by WoS. Approximately 116 research organizations in 14 countries are involved, and the number of reported references ranges from 7 to 186. The number of forward citations for each of the cited references was collected from the Cited References database in WoS and $W_1$ and $W_2$ were constructed from the acquired bibliographic information.

As in case 1, the weighting values of $W_1$ and $W_2$ were determined based on the quartile distributions of forward citations of references and the minimum number of reported references between each pair of targeted papers respectively. For $W_1$, if a shared reference was in the first quartile of the number of forward citations, the shared reference was given a weight of 8, if in the second quartile, the weight was 3, if in the third quartile, the weight was 2, and if in the fourth quartile, the weight was one. For $W_2$, if the number of cited shared references was in the first quartile of the cited shared reference counts, the weight was set at 8, if in the second quartile, the weight was 3, if in the third quartile, the weight was 2 and if in the fourth quartile, the weight was one.

The weighting of $W_1$ and $W_2$, combined with relationship between the set of records and cited shared references [A*R], were used to determine the knowledge homogeneity score (KHS) between the records. A KHS threshold was then utilized to perform hierarchical clustering with single linkage of the records. The records were partitioned into 103 ASE clusters, including many clusters of singletons. Singletons are still possible in the ASE analysis because of the weighting of citations and KHS threshold rules.

During validation using the full name of the author and other ancillary data, 87 "true" clusters (i.e., unique authors with one or more publications) were verified. Twenty-nine records are wrongly assigned, of which 6 were cases of over-matching errors and 23 were cases of under-matching errors. For instance, two publications produced by Li Yue at Chinese Academy of Sciences (CAS) Hefei were separated because of the lack of a shared reference between them. A close examination indicated that these two publications are in different research areas, as evidenced by their subject category codes, explaining the lack of shared reference(s). The first publication is in the category of "Chemistry, Physical; Materials Science, Multidisciplinary" while the second publication is in the category of "Nanoscience & Nanotechnology, Polymer Science." In another example, two publications authored by Li, Ying at CAS Shenyang are in two related, but different, subject categories, i.e., "Acoustics; Chemistry, Multidisciplinary" and "Chemistry, Applied; Engineering, Chemical; Materials Science, Textiles". The verification results indicated an accuracy rate of approximately 80% (for those cases with at least one shared reference).

Comparison

The ASE analysis may be compared with other commonly used disambiguation methods: simply grouping (laissez faire) and name+affiliation. In order to avoid underestimating the effectiveness of the other methods, their optimal results are provided. For example, take simply grouping by name matching: the number of the largest group is taken as the correctly assigned records. In case 1 of "Walsh, J P", the largest true cluster has six papers, providing an accuracy of 25%, i.e., 6/24 is taken for the approach of simply name matching. Accuracy would be lower if we chose a random author or the average accuracy as the benchmark. For the method of name+affiliation matching, a 100% match between the reported name and affiliation in the publication are assumed for those records if the targeted researcher is the only author, or reprint author, or one single affiliation is indicated; and a 50% accuracy rate is assumed for records which do not fit into any of the above three situations. In case 1 of "Walsh, J P", 13 out of 24 records report only one affiliation or report "Walsh, J*" as the sole author or the reprint author. Within these 24 records, "Walsh, John P" is involved in six publications reporting three different institutions: Georgia Institute of Technology (three times), University of Illinois at Chicago (twice), and University of Tokyo (once), thus yielding at least three mistakes. Accordingly, the highest accuracy rate of this method, even assuming no typos and translation problems, is 65%, i.e., ((13−3)+(24−13)*0.5)/24*100%. The misassignments of the two University of Illinois at Chicago and the one University of Tokyo publications are within the 13 records with identifiable affiliation.

In case 2 of "Li, Y", 55 records report one affiliation, and 27 have "Li, Y" as the author. After removing overlapping articles between the two conditions, the name+affiliation matching adds up to 72 papers identifiable with Li, Y and his/her affiliation. Again assuming no misassignment among the 72 publications, after manual standardization and cross checking of affiliation names, the highest accuracy rate would be 63%. The formula is calculated by ((72−17)+(145−72)*0.5))/145*100, where 17 is the number of publications that were incorrectly assigned due to different authors possessing exactly the same English translated name in the same organization.

To provide further comparison between the simply grouping (laissez faire) and name+affiliation methods and the ASE analysis, the excluded singleton records may be included in the set of records to be analyzed. Recall that 26 out of 50 records for case 1 of "Walsh, J P" and 76 out of 221 records for case 2 of "Li, Y" were not included in the ASE analysis because no shared references existed between them and the others records. Including the excluded records does not affect the ASE analysis because the ASE analysis automatically takes those records without shared references as singletons. For example, in case 1, the "Walsh, J*" authors associated with the excluded 26 records will be regarded as 26 different authors. Similarly, in case 2, the 76 authors named "Li, Y" will be classified as different researchers from any "Li, Y" associated with the remaining 145 records of the set. Upon verification, it turns out a large proportion of records (approximately 50% in the "Walsh, J P" case and approximately 83% in "Li, Y" case) that do not share citations are in fact singletons with unique authors.

A comparison of the ASE analysis to the laissez faire method and the name+affiliation method (including in each case records with no shared reference) provides accuracy rates of:

|  | laissez faire | name + affiliation | ASE analysis |
|---|---|---|---|
| Case 1: Walsh, JP | 12% | 63% | 72% |
| Case 2: Li, Y | 4% | 64% | 81% |

The ASE analysis produced the highest accuracy rates, followed by name+affiliation method, while the simple grouping method yielded the lowest rate. As expected, the simple grouping method performs even poorer in the case of a Chinese author given all the problems discussed before. Additionally, the ASE analysis outperformed the other methods in the single field (nanotechnology) case, where more false positives may be expected due to common field references. This suggests that the ASE analysis may be especially powerful in exactly those cases where other methods based on common field keywords, etc., may have the most difficulty.

In addition, the effect of weighting the shared references may be illustrated by comparing the accuracy rates of the ASE analysis with ASE without citation weighting (i.e., all weights=1).

|  | ASE analysis | ASE w/o weighting |
|---|---|---|
| Case 1: Walsh, JP | 72% | 56% |
| Case 2: Li, Y | 81% | 63.8% |

As can be seen above, performing the ASE analysis without citation weighting produced accuracy rates that were similar to those produced using the name+affiliation method. Weighting the cited references resulted in a significant improvement in the ASE analysis accuracy rate of about a 25% increase for both cases. The differences that citation weighting makes are even larger if only records with shared citations are considered.

Given the importance of the weighting values, the ASE analysis may also utilize other sources for the forward citations data such as, but not limited to, Google Scholar and Scopus. Evaluation of case 1 using Google Scholar and Scopus, which have become increasingly popular as alternatives to or complements of WoS, were carried out. The forward citations of the shared 114 references of the "Walsh, J P" case were obtained from both Google Scholar and Scopus databases. The weighting values of $W_1$ was determined for both sets of results and used to perform the ASE analysis. The new measures of forward citations change the weighting of $W_1$ and therefore the knowledge homogeneity scores used for clustering the records. We find that the forward citations in WoS and Google Scholar are correlated 0.83, while forward citations in Scopus are correlated with the counts from the other two databases in the range of 0.35-0.46. These results show that ASE analysis is rather robust across these three citation databases, which is not surprising given the high correlations among the citation counts recovered from the different databases. One record in Google Scholar and three records in Scopus are misassigned compared to one misassignment in WoS. Examination indicates the formats of the cited references and inconsistent coverage of journals partially accounts for Scopus having a lower correlation in citations with WoS and Google Scholar.

As a second robustness check, the whole process of name disambiguation for "Walsh, J P" case was repeated using the Scopus database. To make the search comparable to case 1 indexed with WoS, the search strategy in Scopus is also confined to social science publications. This restriction returned 164 publications. After removing "Walsh, J?" where "?" is not P, 41 records were left with 37 citing references and 17 records including at least one shared reference. Determining the weighting values and the KHS, the ASE analysis produced a 100% accuracy rate for the 17 articles with at least one shared reference. Thus, the ASE analysis appears to be fairly robust to difference sources of citations for the weighting matrix ($W_1$) and to the use of different bibliometric databases (e.g., WoS or Scopus). Of course, given the full names and author-affiliation information in Scopus, name+affiliation will also produce a higher accuracy rate using Scopus (i.e., approximately 94% in this case).

The ASE analysis also is affected by the KHS threshold, the minimum value of KHS that two records need to have before being considered ASE, and thus included in the same cluster. The KHS threshold value(s) may be predefined based on intuition (e.g., based upon rarely cited references or commonly cited references) and/or experience gained through trial and error. For example, the KHS threshold could be set using a two step process comprising: 1) using a set of "gold standard" records to benchmark the data for a particular field or database or country by adjusting the threshold to maximize the match with the gold standard, and 2) using this new KHS threshold when determining ASE for the rest of the (unknown) cases in the data set. Alternatively, the KHS threshold could be adjusted across a range and noting the changes in the clustering, producing a robustness range, wherein the results are similar across a range of threshold values from $K_i$ to $K_j$.

Figure 7:
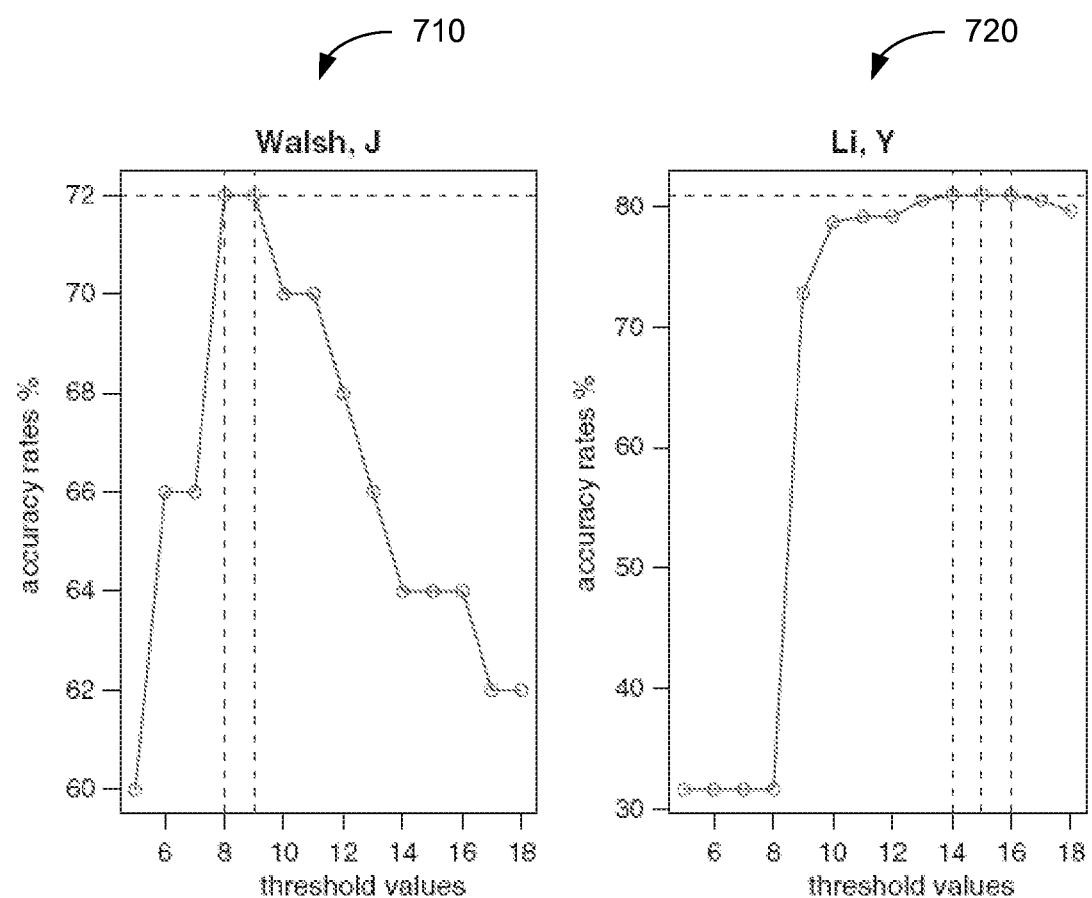
FIG. 7 is a graphical illustration of the sensitivity of the ASE analysis of FIGS. 2 and 3 to variations in threshold values according to various embodiments of the present disclosure.

With reference to FIG. 7, the sensitivity of the accuracy rates to variations in the KHS threshold values for both case 1 and case 2 are graphically depicted in graphs 710 and 720, respectively. In the "Walsh, J P" case 710, the accuracy rate would be greater than 60% if the KHS threshold is defined anywhere in the range between 5 and 18. And the accuracy rate is not less than 70% if the value is defined in the range between 8 and 11. For the set of records from the "Li, Y" case 720, any threshold defined in the range between 13 and 18 yields an accuracy score of approximately 80%. These results show that the accuracy rates allow for some variation in the threshold values.

Therefore, at least the following is claimed:

1. Non-transitory computer readable medium having a program that, when executed by a computing device, causes the computing device to:

obtain a set of records from a database, wherein the set of records are shopping baskets including selected items, where each shopping basket includes a shopper as a source;

determine a knowledge homogeneity score (KHS) for a pair of records in the set of records; and determine a condition of ASE for the pair of records based upon the KHS and a predefined KHS threshold.

2. The system of claim 1, wherein the ASE analyzer further comprises:

logic that determines whether a source of each of the pair of records is the same source based upon the determined ASE condition.

3. The system of claim 1, wherein the KHS is determined based upon a plurality of selected items shared by the pair of records.

4. The system of claim 2, wherein the ASE analyzer comprises logic that determines a weighting value for a selected item shared by the pair of records.

5. The system of claim 4, wherein the logic that determines the weighting value for the selected item further determines a weighting value for each shared selected item in the plurality of selected items shared by the pair of records, where the KHS is determined based upon the weighting value of each shared selected item.

6. The system of claim 1, wherein the weighting value for the selected item shared by the pair of records is based upon sales of the selected item.

7. The system of claim 1, wherein the logic that determines the KHS determines a KHS for each pair of records in the set of records.

8. The system of claim 7, wherein the KHS for each pair of records is determined based upon at least one selected item shared by that pair of records.

9. The system of claim 7, wherein the ASE analyzer further comprises:

logic that determines a weighting value for each selected item shared by at least two records in the set of records, and where the KHS for each pair of records is determined based upon the weighting value of each reference item shared by that pair of records.

10. The system of claim 9, wherein the ASE analyzer further comprises:

logic that determines a second weighting value for each record in the set of records, where the second weighting value is based upon a number of selected items shared with that record and a total number of selected items of the at least two records in the set of records, and where the KHS for each pair of records is further determined based upon the second weighting value.

11. The system of claim 7 wherein the logic that determines the condition of ASE for the pair of records determines a condition of ASE for each pair of records in the set of records based upon the corresponding KHS and the predefined KHS threshold.

12. The system of claim 11, wherein the ASE analyzer further comprises:

logic that clusters the records in the set of records based upon the ASE condition for each pair of records in the set of records.

13. The system of claim 12, wherein the ASE analyzer further comprises:

logic that provides the clusters of records for rendering as a heat map including axes indicating at least a portion of the set of records, each cluster of records associated with a common source.

14. A method, comprising:
- determining, in a computing device, a plurality of reference items shared by at least two records in a set of records obtained from a database;
- determining, in the computing device, a weighting value for each shared reference item of the plurality of reference items based upon a number of forward citations that cite that shared reference item, where the weighting value for each shared reference item varies inversely with a number of forward citations that cite that shared reference item;
- determining, in the computing device, a knowledge homogeneity score (KHS) for each pair of records in the set of records based upon at least one shared reference item that is shared by that pair of records and the weighting value corresponding to the at least one shared reference item; and
- determining a condition of approximate structural equivalence (ASE) for each pair of records based upon the KHS and a KHS threshold.

15. The method of claim 14, wherein the condition of ASE is based upon a plurality of KHS thresholds.

16. The method of claim 14, further comprising:
- clustering the records in the set of records based upon the ASE condition for each pair of records in the set of records.

17. The method of claim 14, wherein the weighting value is based upon reference items shared by at least two records in the set of records, and where the KHS is determined based upon the weighting value of each shared reference item.

18. The method of claim 14, further comprising:
- determining a second weighting value for each record in the set of records, where the second weighting value is based upon a number of reference items shared by with that record and a number of reference items shared by at least two records in the set of records, and
- where the KHS for each pair of records is further determined based upon the second weighting value.

19. The method of claim 14, further comprising:
- obtaining the set of records from at least one database; and
- obtaining reference items associated with each record in the set of records.

20. The method of claim 14, wherein the set of records includes a plurality of records identified within a document as having the same source.

21. A system comprising:
- at least one computing device; and
- an approximate structural equivalence (ASE) analyzer executable in the at least one computing device, the ASE analyzer comprising:
  - logic that obtains a set of records from a database;
  - logic that determines a weighting value for a reference item shared by a pair of records in the set of records that is based upon a number of forward citations that cite the reference item, where the weighting value for the reference item varies inversely with the number of forward citations that cite the reference item;
  - logic that determines a knowledge homogeneity score (KHS) for the pair of records based at least in part upon the weighting value of the reference item shared by the pair of records; and
  - logic that determines a condition of ASE for the pair of records based upon the KHS and a predefined KHS threshold.

22. The system of claim 21, wherein the logic that determines the KHS determines a KHS for each pair of records in the set of records.

23. The system of claim 22, wherein the KHS for each pair of records is determined based upon at least one reference item shared by that pair of records.

24. The system of claim 22, wherein the ASE analyzer further comprises:
- logic that determines a weighting value for each reference item shared by at least two records in the set of records, where the weighting value for each shared reference item is based upon the number of forward citations that cite that shared reference item, and
- where the KHS for each pair of records is determined based upon the weighting value of each reference item shared by that pair of records.

25. The system of claim 24, wherein the ASE analyzer further comprises:
- logic that determines a second weighting value for each record in the set of records, where the second weighting value is based upon a number of reference items shared with that record and a total number of reference items of the at least two records in the set of records, and
- where the KHS for each pair of records is further determined based upon the second weighting value.

26. The system of claim 22, wherein the logic that determines the condition of ASE for the pair of records determines a condition of ASE for each pair of records in the set of records based upon the corresponding KHS and the predefined KHS threshold.

27. The system of claim 26, wherein the ASE analyzer further comprises:
- logic that clusters the records in the set of records based upon the ASE condition for each pair of records in the set of records.

28. The system of claim 27, wherein the ASE analyzer further comprises:
- logic that provides the clusters of records for rendering as a heat map including axes indicating at least a portion of the set of records, each cluster of records associated with a common source.

29. The system of claim 21, wherein the records are publications, where each publication includes an author as a source.

30. The system of claim 21, wherein the records are patent publications, where each patent publication includes an inventor as a source.

31. The system of claim 21, wherein the records are accessing histories, where each accessing history includes a viewer as a source.

* * * * *